(12) United States Patent
Koenig

(10) Patent No.: US 11,966,150 B1
(45) Date of Patent: Apr. 23, 2024

(54) TOILET PROJECTOR AND METHOD OF USE

(71) Applicant: Jeff Koenig, Aurora, OR (US)

(72) Inventor: Jeff Koenig, Aurora, OR (US)

(*) Notice: Subject to any disclaimer, the term of this patent is extended or adjusted under 35 U.S.C. 154(b) by 0 days.

(21) Appl. No.: 18/450,353

(22) Filed: Aug. 15, 2023

(51) Int. Cl.
 *G03B 21/14* (2006.01)
 *A47K 17/00* (2006.01)
 *G03B 21/00* (2006.01)

(52) U.S. Cl.
 CPC ............ *G03B 21/145* (2013.01); *A47K 17/00* (2013.01); *G03B 21/001* (2013.01)

(58) Field of Classification Search
 CPC .... G03B 21/001; G03B 21/14; G03B 21/132; G03B 21/145; G03B 21/208; A47K 17/00; A47K 13/06; A47K 13/026; A47K 13/028; A47K 13/10; A47K 13/24; A47K 13/302; H04N 9/3141; H04N 9/3152
 See application file for complete search history.

(56) References Cited

U.S. PATENT DOCUMENTS

| | | | |
|---|---|---|---|
| 2005/0073659 A1* | 4/2005 | Sannohe | G02B 5/005 353/56 |
| 2008/0049200 A1* | 2/2008 | Nozaki | H04N 1/00129 348/E5.143 |
| 2008/0143966 A1* | 6/2008 | Mastrosimone-Gese | G03B 21/001 353/30 |
| 2009/0279056 A1* | 11/2009 | Belliveau | G03B 21/145 353/119 |
| 2016/0307462 A1* | 10/2016 | McCarthy | G09B 19/0076 |
| 2016/0313636 A1* | 10/2016 | Chien | F21V 21/08 |
| 2018/0059527 A1* | 3/2018 | Alexander | G03B 21/005 |
| 2022/0099261 A1* | 3/2022 | Wei | F21V 21/30 |

* cited by examiner

*Primary Examiner* — Sultan Chowdhury
(74) *Attorney, Agent, or Firm* — Mark S Hubert

(57) ABSTRACT

An adjustable, image projector with an auto on/off motion sensor, that has an adjustable housing to center the projected image in the toilet bowl. It has the ability to interchange photo slides of individuals that are either made-to-order by the fabricator, or that are fabricated by the owner with materials provided by the manufacturer. It has the ability to provide ongoing revenue for the manufacturer in the form of subsequent orders for specific photo slides or subsequent orders of blank photo slides that the owners can print their private images onto at home with the aid of a printer and a computer.

11 Claims, 11 Drawing Sheets

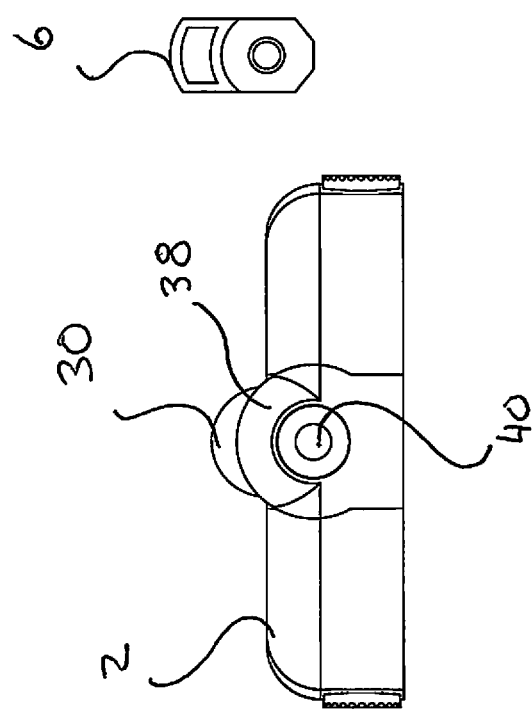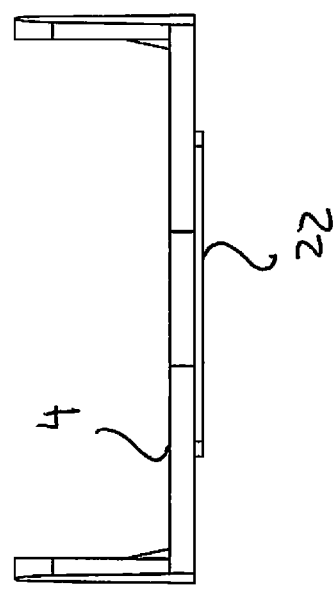
FIG. 10

TOILET PROJECTOR AND METHOD OF USE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to satire, and more particularly to potty humor.

BACKGROUND

Human waste elimination jokes abound in our society. Some find them crude and unrefined, while other revel in them. Regardless of one's tastes, the type of humor wherein one person defecates on another person, or on their personal property, has become so mainstream it is often summarized with simple three words. Similarly, political satire is another huge topic for humor.

Henceforth, a device that lets one release their bowels at the same time they release their political or other frustrations, and get a laugh at well, would fulfill a long felt need in today's society. This new invention utilizes and combines known and new technologies in a unique and novel configuration to overcome the aforementioned problems and accomplish this.

BRIEF SUMMARY

In accordance with various embodiments, a toilet mountable, projection beam, with an adjustable base and a motion activated projector is provided.

In one aspect, a satirical device that allows one to target a specific person's image projected into a toilet bowl, with their urine when emptying their bladder, is provided.

In another aspect, a toilet bowl projector that may be specifically tailored by the owner, to project a photographic image of any person that they wish to defecate on, is provided.

In yet another aspect, a method of using a toilet projector with interchangeable, customizable, projection slides, so as to illuminate a toilet bowl with the likeness of any person the owner chooses, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 10 is a front disassembled view of the toilet projector;

DETAILED DESCRIPTION OF CERTAIN EMBODIMENTS

Figure 1:
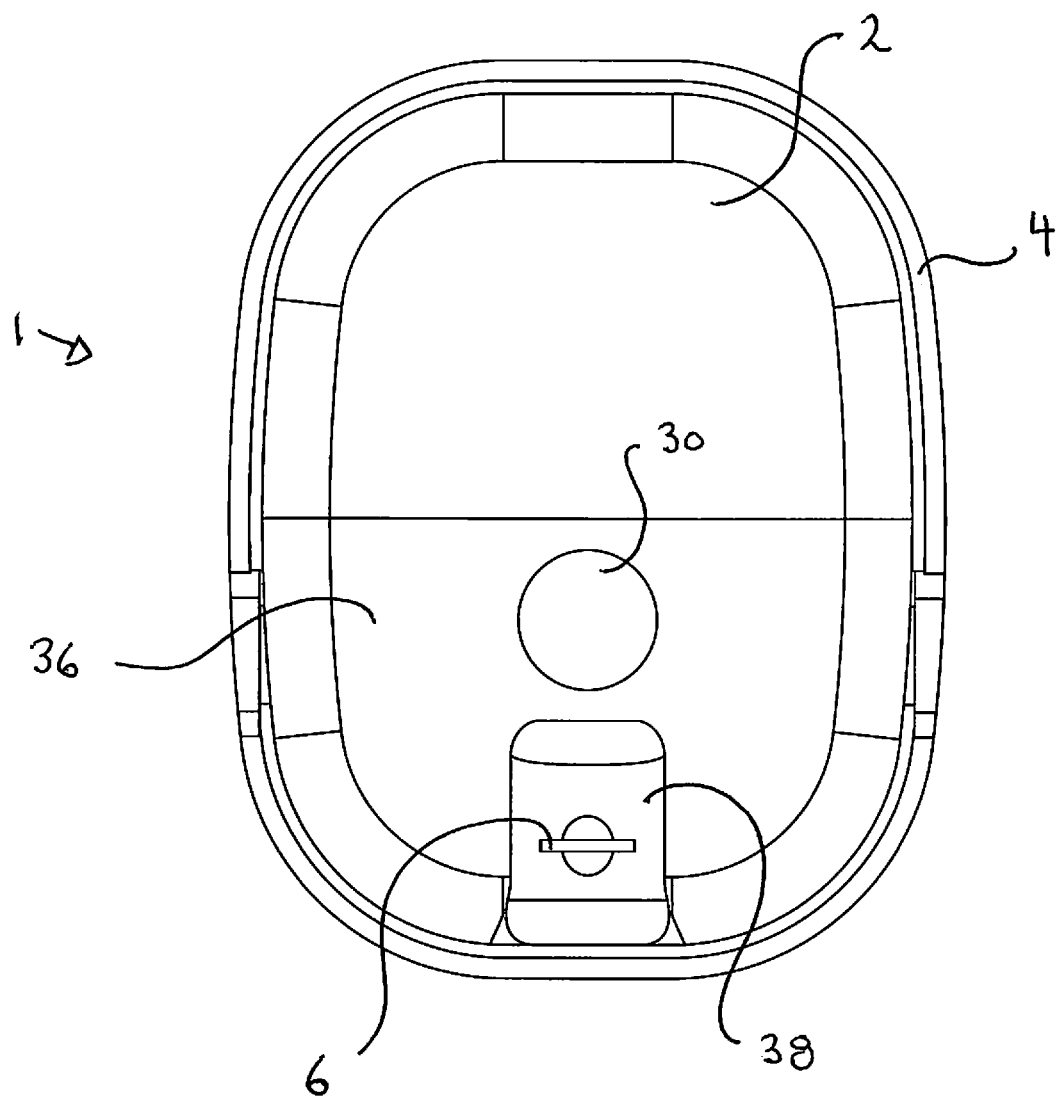
FIG. 1 is a top view of the toilet projector.
Figure 2:
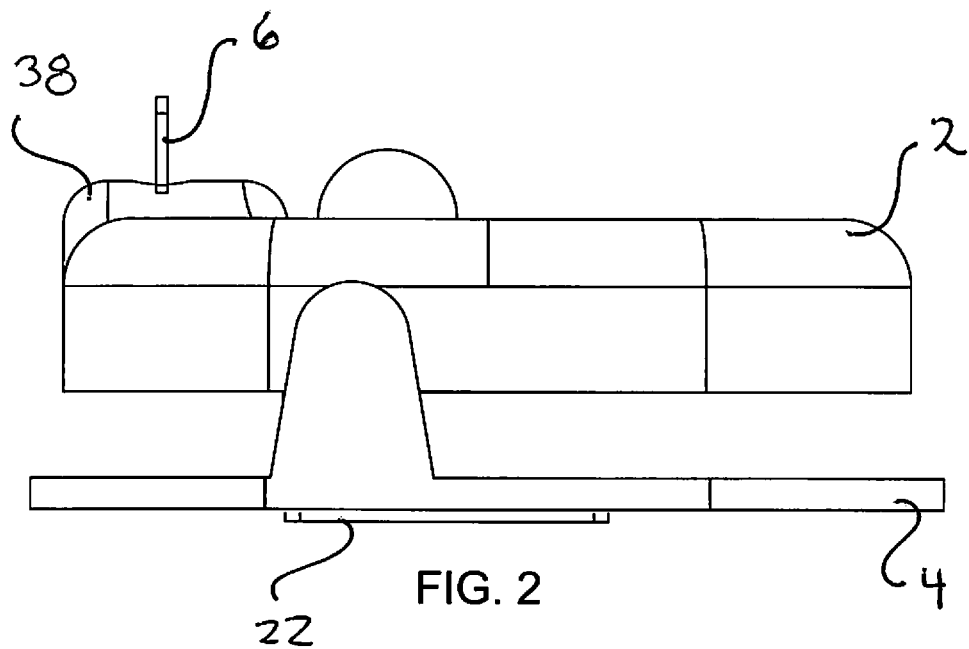
FIG. 2 is a left side view of the toilet projector.
Figure 3:
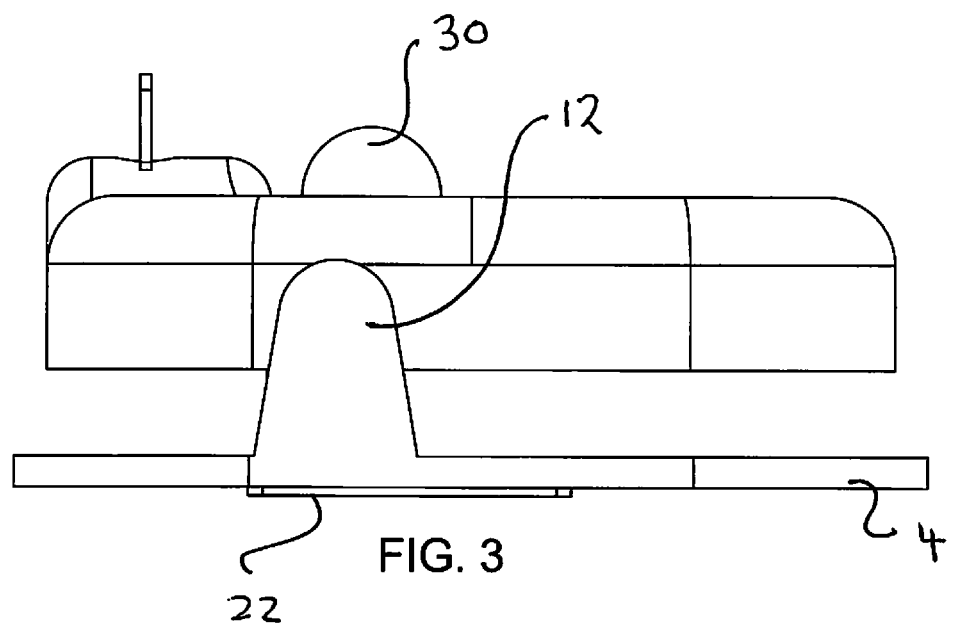
FIG. 3 is a right side view of the toilet projector.
Figure 4:
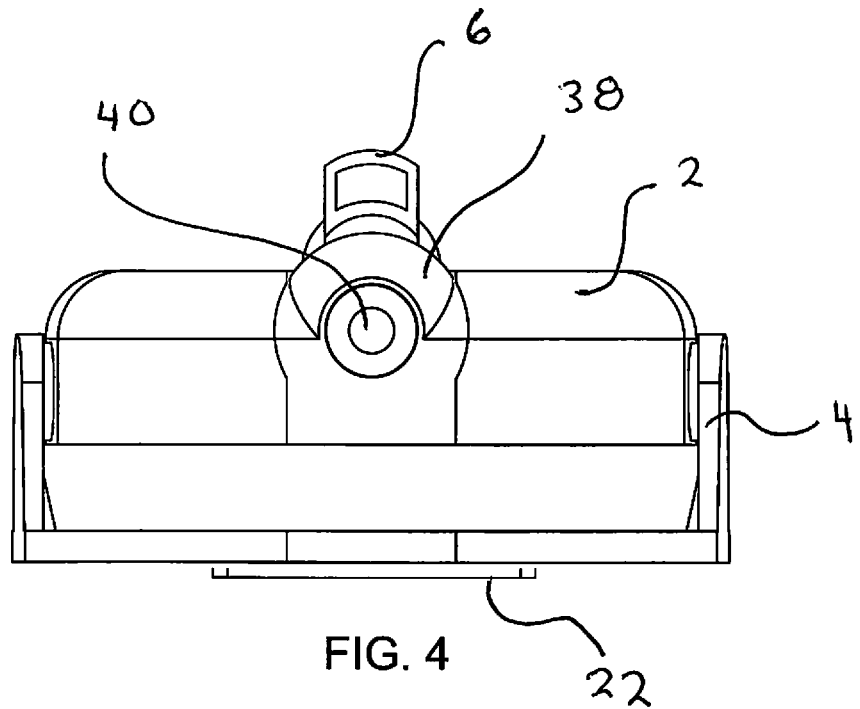
FIG. 4 is a front side view of the toilet projector.
Figure 5:
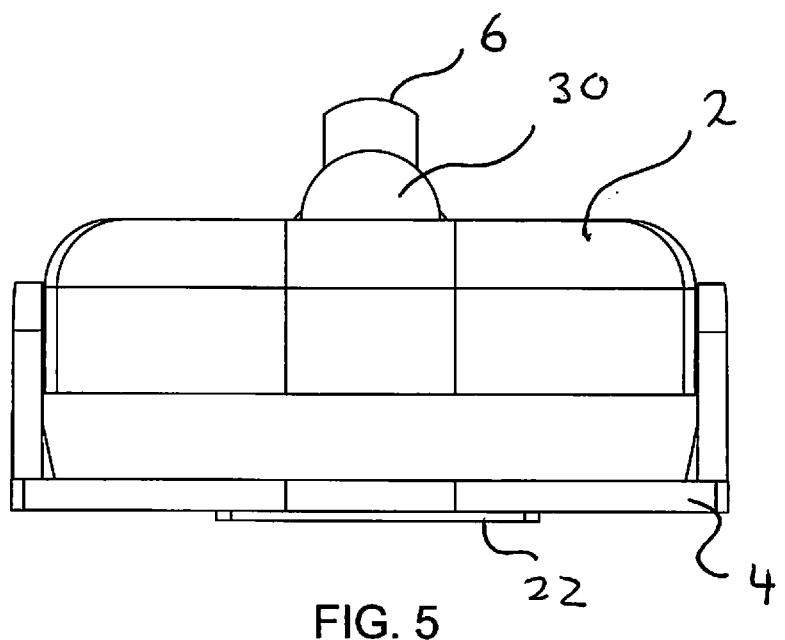
FIG. 5 is a rear side view of the toilet projector.
Figure 6:
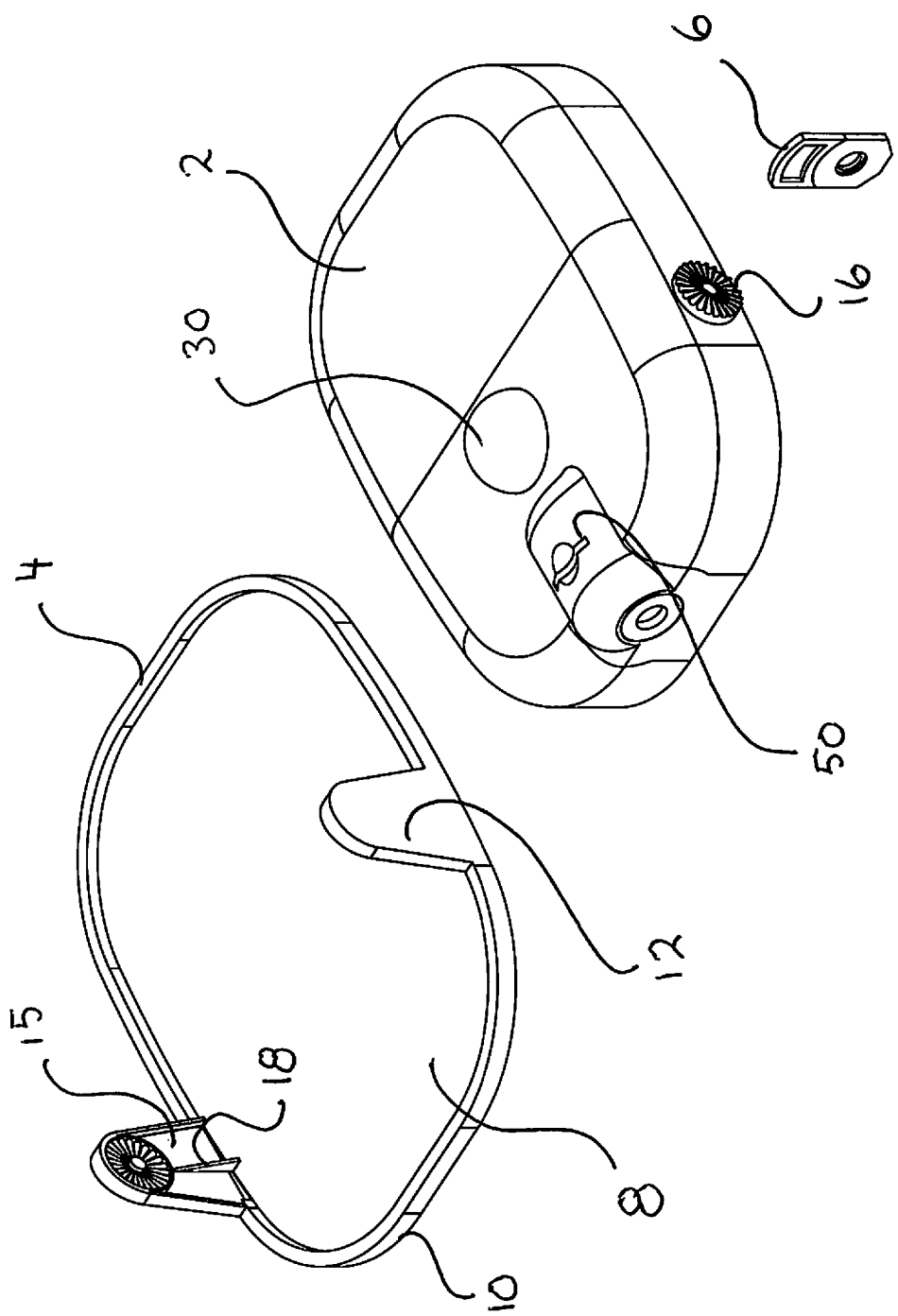
FIG. 6 is a front perspective disassembled view of the toilet projector.
Figure 7:
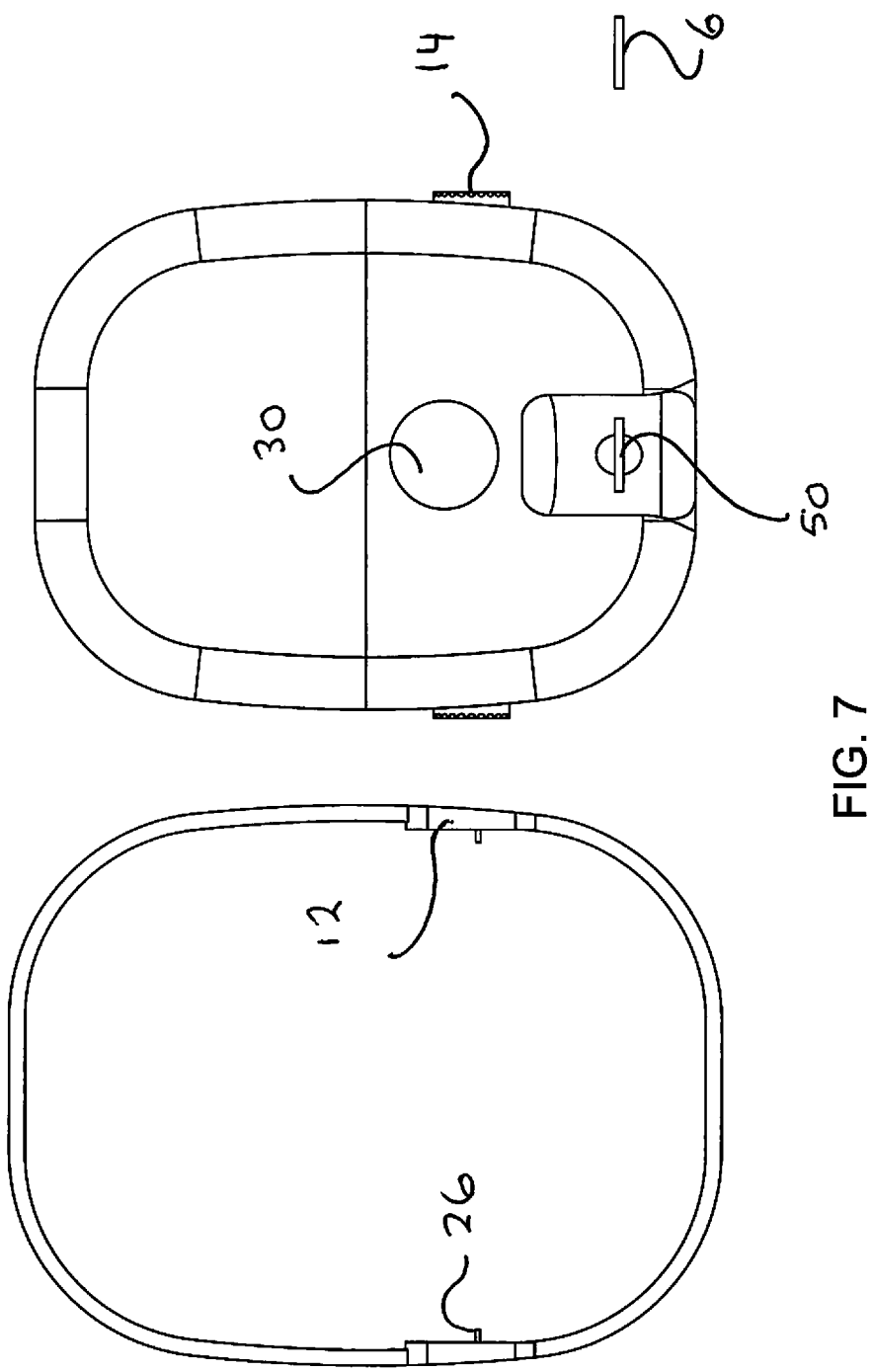
FIG. 7 is a top disassembled view of the toilet projector.
Figure 8:
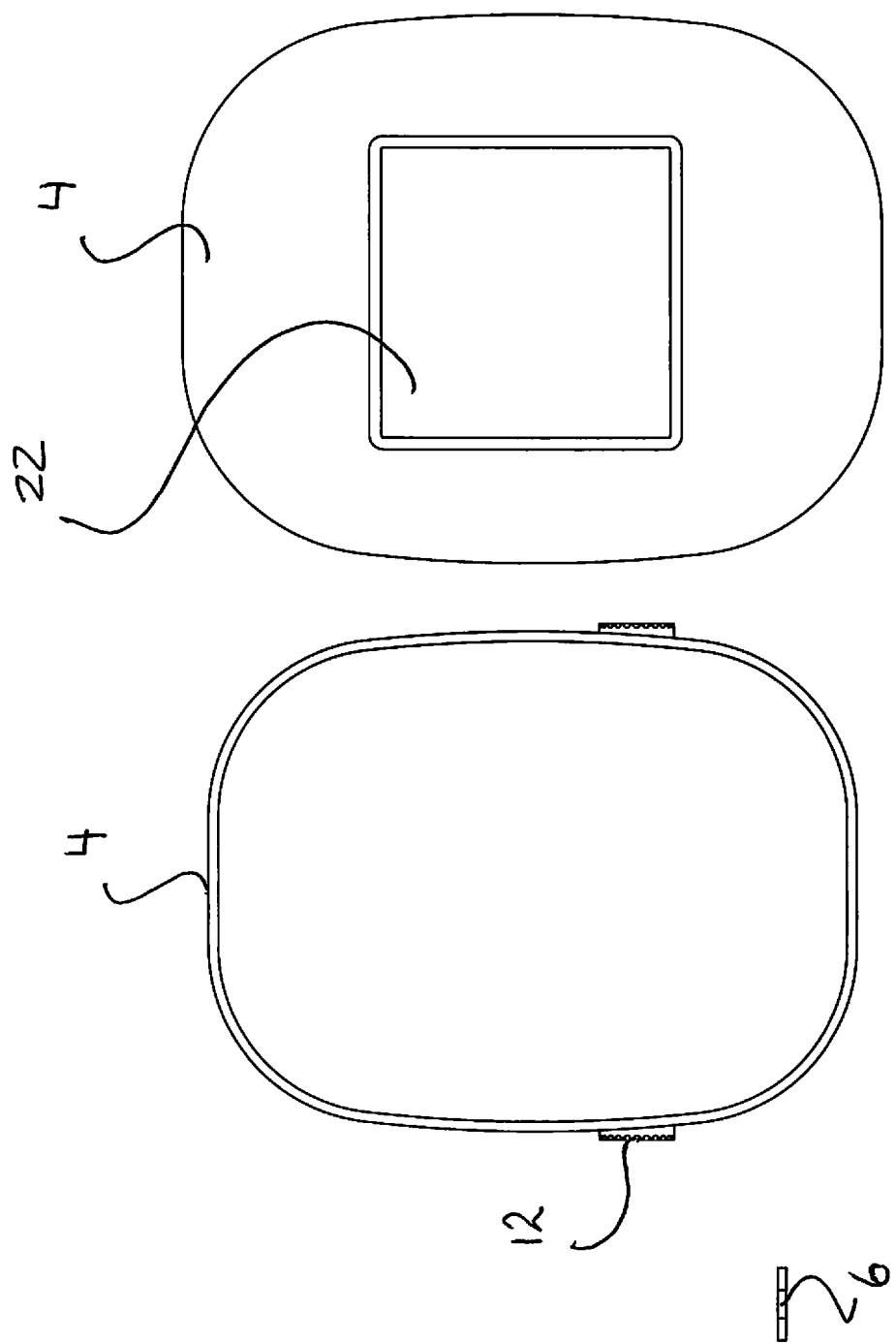
FIG. 8 is a bottom disassembled view of the toilet projector.
Figure 9:
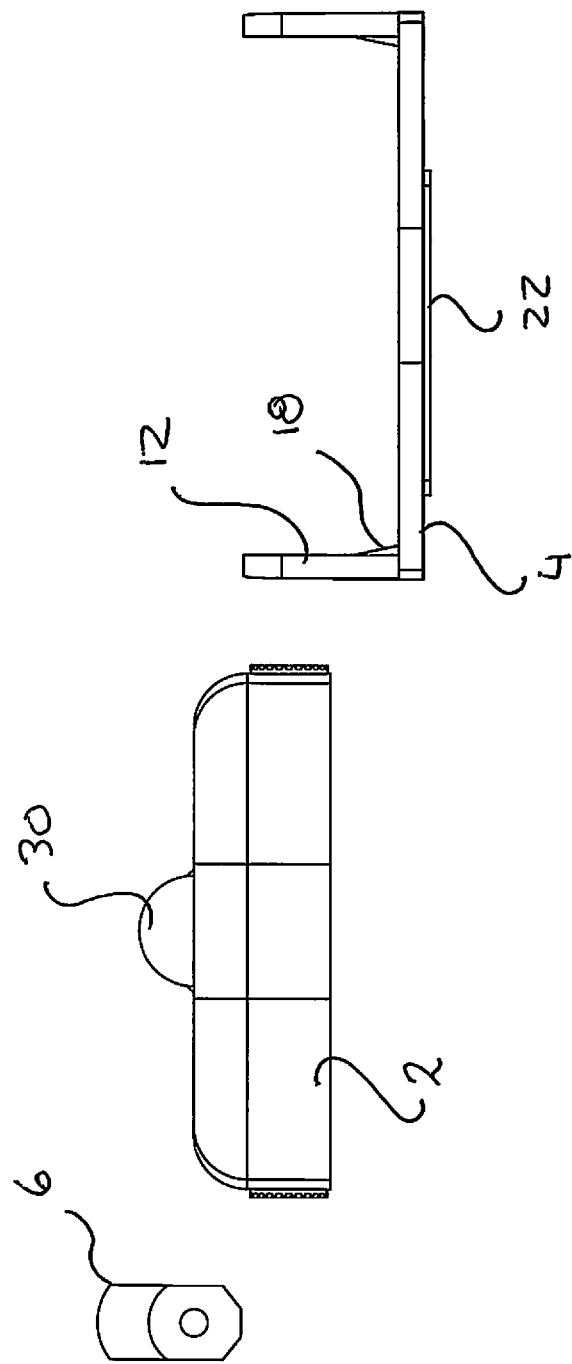
FIG. 9 is a rear disassembled view of the toilet projector.
Figure 11:
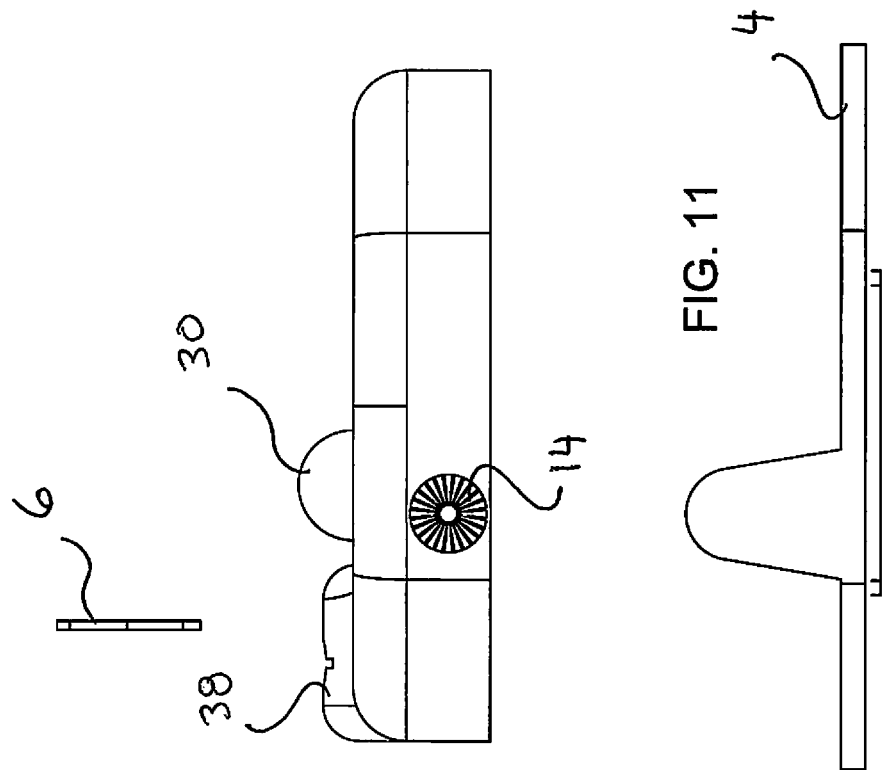
FIG. 11 is a side disassembled view of the toilet projector.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that when an element or layer is referred to as being "on," "coupled to," or "connected to" another element or layer, it can be directly on, directly coupled to or directly connected to the other element or layer, or intervening elements or layers may be present. With electrical components being connected to refers to an electrical/electronic coupling either via hard wires or wirelessly so as to be in operable electrical contact. Stated otherwise, when electrical/electric components are connected, the signal from one connected component directs or otherwise affects the actions of the other connected components.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "projection focal system" refers to the projector components between and including the light source (illumination means) and the and the exiting projection light beam after the final focusing lens. This may vary with the design of the projector, but generally is comprised of an illumination means, an optional reflector and condensing lens, an image mount slide frame and a focusing lens.

As used herein, the term "image slide mount" is a mechanical body that holds and specifically aligns a transparent image slide (also referred to as a photo slide) within or with on itself, and that is matingly engagable within an image slide mount frame in the projection focal system at a point between the illumination means and the focusing lens that will provide a clear projected image at the intended projection distance.

As used herein, the term "proximity sensor" refers to any one of a set of electronic sensors that can detect motion in their vicinity, or detect objects within a preset distance from them. These are also referred to as motion detectors or motion sensors.

The present invention relates to a novel design for an adjustable, image projector with an auto on/off motion sensor, that has a self-locking, adjustable housing to center the projected image in the toilet bowl. It adhesively affixes to the underside of the toilet seat and tiltably adjusts and self-locks to project its projected light beam into the toilet bowl. It has the ability to interchange image slides of individuals that are either made-to-order by the fabricator, or that are fabricated by the owner with materials provided by the manufacturer. It has the ability to provide ongoing revenue for the manufacturer in the form of subsequent orders for specific printed image slides, or subsequent orders of blank image slides that the owners can print their private images onto at home with the aid of a printer and a computer.

Figure 14:
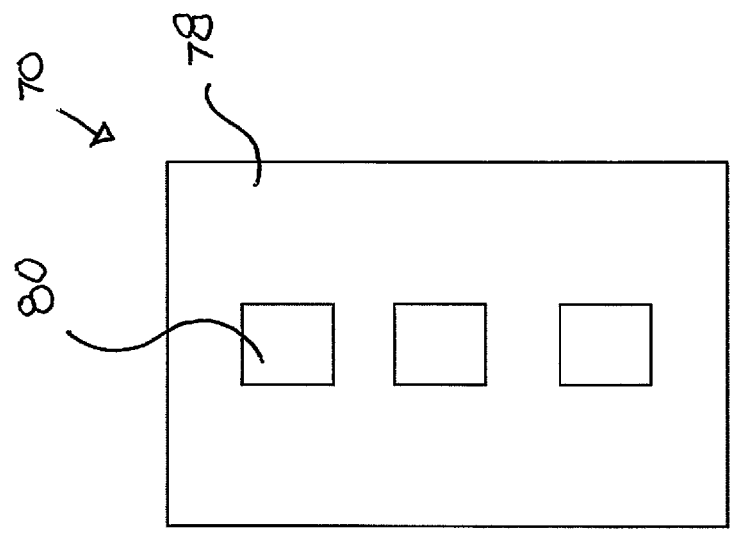
FIG. 14 is a front view of the printable photo slide array.

Looking at FIGS. 1-11 the toilet projector's external design can best be explained. The overall design of the toilet projector 1 has the following components: a housing body 2, a tilt base 4, an insertable image slide mount 6 and an image slide 8. (see FIGS. 6, 13 and 14)

The tilt base 4 has a planar bottom plate 8 with a raised peripheral edge 10 extending normally therefrom. There are a pair of tilt arms 12 rising from opposing sides of the base 4 from the peripheral edge 10, and extending perpendicularly from the plane of the bottom plate 4. Each tilt arm has a first circular serrated disk 14 projecting from the upper region of its inner face 15. These first circular serrated disks 14 are matingly engageable with a pair of opposing second circular serrated disks 16 on the outer sides of the housing body 2. There are right triangular reinforcements 18 running along the longitudinal centerline of each tilt arm 12, beginning at the bottom of the serrated disk 14 such that their hypotenuse sides extend away from the tilt arms 12 toward the bottom of each tilt arm 12. These reinforcements 18 with their thinnest sections under the first serrated disks 14 allow the tilt arms 12 to flex slightly outward, away from the housing body 2 when the housing body 2 is tilted with respect to the plane of the bottom plate 8 and the mated first and second serrated circular disks 14 and 16 expand and contract as their serrated teeth 20 lock and unlock to affix the tilt of the housing body 2. This allows for the self-locking feature of the tiltable housing body 2.

Projecting perpendicularly from the center of each of the first serrated disks 14, is a stub axle 26 that fits into matingly sized orifices in the second serrated disks 16. (see FIG. 7) This maintains the first and second serrated disks 14 and 16 in contact when they expand and contract as their serrated disks 14 and 16 slide over one another. (see FIG. 11) There is an adhesive means 22 on the bottom face of the tilt base 4, which in the preferred embodiment is double sided tape, although the device 2 may be affixed to any surface with a plethora of mechanical or chemical adhesives such as glue, adhesive caulk, silicone, contact cement, magnets, screws, bolts or other mechanical fasteners.

The housing body 2 tiltably resides within the tilt arms 12 directly above the bottom plate 8 of the tilt base 4. It has a proximity sensor dome 30 centrally located and rising above the top face of the body 2 which houses the proximity sensor 32 which is connected to the microprocessor 34 inside the housing body 2. There are a pair of second circular serrated disks 16 substantially identical to the first circular serrated disks 14 except for the stub axle 26 and orifice. Rising on an acute angle from the top face 36 of the housing body 2 is the projection tunnel 38. There is a slide slot 50 in the top of the projection tunnel 38 that allows the sliding insertion of the image slide mount 6 into the image slide mount frame 46 which resides within the projected light beam path of the projection focal system 39. The front of the projection tunnel 38 has an orifice that the projection lens 40 resides in. The remainder of the housing body 2 has a puck like configuration and is made with a two part clamshell design as is well known in the industry.

Figure 12:
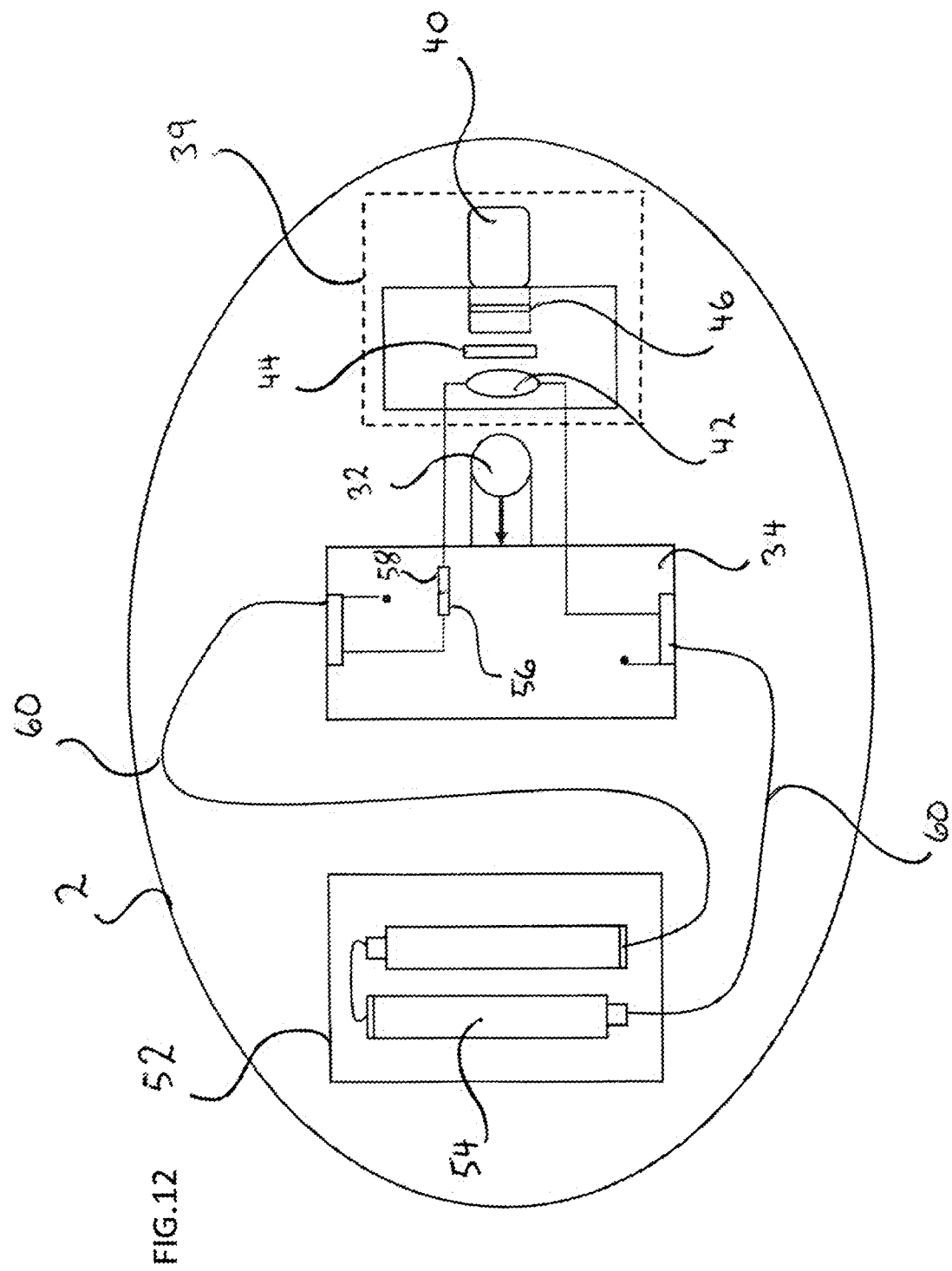
FIG. 12 is an internal view of the body of the toilet projector.

FIG. 12 shows the placement of the operating components within the housing body and the projection tunnel. There is a battery case 52 that houses and connects the batteries 54, and distributes their electrical power to the microprocessor 34 and the illumination means 42 via hard wiring 60. The microprocessor 34 is connected to the proximity sensor 32, and upon receipt of a signal 51 that there is movement within the optical range of the proximity sensor 32, activates the power switch 56 and timing circuit 58 to turn on and off the illumination means 42. The projection focal system 39 (which is housed under the projection tunnel 38 and bounded by the dashed line box) is comprised of the illumination means 42, the optional reflector and condensing lens 44, the image slide mount frame 46 and the focusing lens 40. In the preferred embodiment the illumination means 42 is a light emitting diode although other means such as incandescent or laser lights may be used.

Figure 13:
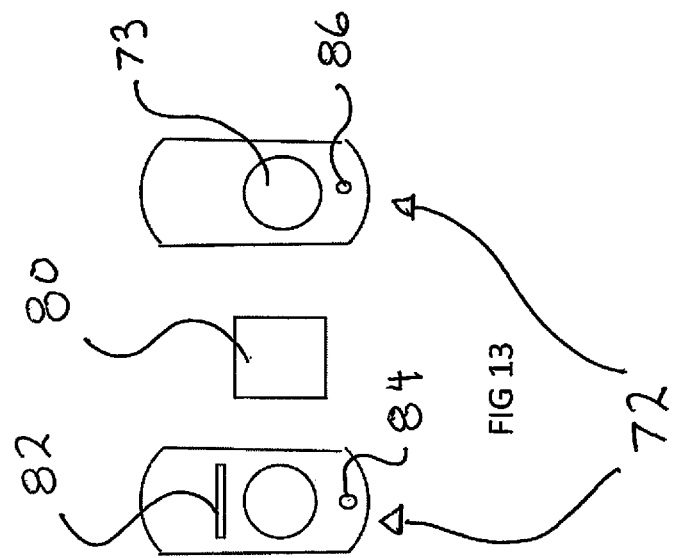
FIG. 13 is a front view of the second embodiment slide frame.

The image slide 8 and method of getting the image out of the projector 1 can best be explained in the following steps, looking at FIGS. 12-13. In the first embodiment the projector 1 is sold with a preselected image/s printed on image slides 8 and held in the correct alignment for illumination by the image slide mount 6. These images would be popular images generally aimed into the political satire venue.

In operation, a digitized image is provided to the manufacturer who prints this digitized image onto transparent photo slide media so as to make an image slide 8 that is then aligned and fixed within or with on the insertable image slide mount 6. The image slide mount 6 is manually inserted into the slide slot 50 of the image mount slide frame 46 until it abuts its bottom. This aligns the image slide 8 into the projection illumination beam running through the projection tunnel 38 of the projector 2. Batteries 54 are placed into the battery case 52. The tilt base 4 of the projector 2 is affixed somewhere along the approximate centerline underside of a toilet seat cover with its adhesion means 22. This location is determined by the height and shape of the toilet's bowl and seat cover. With the toilet seat in the vertical, upright position, the housing body 2 is rotated on the tilt base 4 until the projection path of the projection focal system strikes the approximate center of the toilet bowl, and the image presented is clear and recognizable. The first circular serrated disks 14 will flex outward on the tilt arms 12 as their teeth slide over the teeth of the second serrated disks 16 and the tilt arms will flex back in to self-lock any further movement. The illumination means 42 is switched on by the microprocessor 34 when the proximity sensor 32 senses movement. This sends a beam of light from the illumination means 42 through the optional reflector and condensing lens 44, the image slide 8 and the projection lens to strike and present the image on the toilet bowl. When the microprocessor's timing circuit times out, the illumination means 42 turns off. The operation of the toilet projector 1 is tested testing by causing movement in a sphere of motion detectable by the motion sensor.

However, this model does not allow for recurring revenues for the manufacturer. To accomplish this, the projector 2 was designed to have a consumer selected, image 8 put into the image slide mount 6 and inserted into the image slide mount frame 46 via the slide slot 50, so as to allow for the consumer to personalize their toilet projections. Such photos 8 might include the consumer's boss, ex-wife, competitor, enemy, etc.

Recurring revenues may be accomplished in two different ways. In the first way the manufacturer will provide transparent image slides 8 to the consumer of digitized images that the consumer provides electronically to the manufacturer (via email or a dedicated website application). This involves the following steps:

Digitizing of a selected image by the consumer.

Uploading and transmitting the selected image to the manufacturer (a third party).

Submitting payment to the manufacturer, for processing of the selected image. (This step may occur at any step of this process/method.)

Receiving the consumer's digitized image/s and printing a transparent image slide 8 sized for mounting in an image slide mount 6.

Aligning and mounting the image slide 8 into the image slide mount 6.

Shipping the consumer, the image slide mount 6.

With the desired image slide mounts 6 in hand, the consumer follows the steps herein from the method of getting the image out of the projector 1.

In an alternate method for generation recurring revenues, the manufacturer provides printable, blank image slides 80 on a printable image slide substrate 70, a consumer-loadable image slide mount 72 and a software printing application to the consumer, such that the consumer can print their own digitized images onto the provided printable, blank image slides 80 and mount them into the self-loadable image slide mount 72. This method has the following steps:

Providing a printable, blank photo slide substrate 70 to the consumer. (In the preferred embodiment, this would be an 8.5×11 inch sheet of paper or card stock 78 with printable blank transparent image slides 80 located on specific printable areas.

Providing a consumer-loadable image slide mount 72 to the consumer.

Providing the consumer, a downloadable, photo slide software printing application for a consumer available computer.

Downloading the image slide software printing program onto consumer's computer.

Selecting a digitized image by the consumer, and uploading it into the image printing application on the consumer's computer.

Printing the digitized image on the printable, blank transparent photo slide 80 in the printable areas of the substrate printable photo slide substrate 70 with the photo slide software printing application on the customer's available printer.

Removing the printed image slide 80 from the printable image slide substrate 70 and aligning it on the image slide mount 72 within the alignment area 73.

Assembling the image slide mount 72 with the constrained image slide 80.

With the desired image slide mount/s 6 in hand, the consumer follows the steps herein from the method of getting the image out of the projector 1.

In the preferred embodiment the image slide mount 72 has a first half and a second half with alignment indicators 82 for the image slide 80. These two halves would be connectable with a simple mechanical lock such as a tab 84 and slot 86 on the first and second photo slide mounts.

It is to be noted, that in other alternate embodiments the photo slide may be put onto, rather than into a photo slide mount. There are a plethora of different designs and configurations for a photo slide mount, the critical design element being the photo slide mount is engageable and alignable within the image slide mount frame in the illumination path of the projection focal system.

In operation, a digitized photo is provided to the manufacturer who prints this digitized photo onto transparent photo slide media so as to make a photo slide 8 that is then aligned and fixed within or with on the insertable photo slide mount 6. The photo slide mount 6 is inserted into the slide slot 50 of the image mount slide frame until it abuts its bottom. This aligns the photo slide 8 into the projection illumination beam running through the projection tunnel 38 of the projector 2. The tilt base 4 of the projector 2 is affixed to the underside of a toilet seat cover with its adhesion means 22 and the housing body 2 is tilted such that the projection path strikes the approximate center of the toilet bowl, and the image presented is clear and recognizable. The first circular serrated disks 14 will flex outward on the tilt arms 12 as their teeth slide over the teeth of the second serrated disks 16. The illumination means 42 is switched on by the microprocessor 34 when the proximity sensor 32 senses movement. This sends a beam of light from the illumination means 42 through the optional reflector and condensing lens 44, the photo slide 8 and the projection lens to strike and present the image on the toilet bowl. When the microprocessor's timing circuit times out, the illumination means 42 turns off.

While certain features and aspects have been described with respect to exemplary embodiments, one skilled in the art will recognize that numerous modifications are possible. Moreover, while the procedures of the methods and processes for building, assembling and using the devices described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. An adjustable, toilet projector, comprising:
   image slide mounts with at least one image slide thereon;
   a planar tilt base made of a plate with a pair of outwardly flexible self-locking tilt arms extending therefrom, wherein each of said tilt arms has a first serrated circular disk extending inwardly therefrom;
   a projector body with a pair of second serrated circular disks extending therefrom, wherein said first and second serrated circular disks are matingly engagable between said flexible tilt arms and said projector body, such that said projector body is tiltably mounted and self-locks onto said pair of outwardly flexible tilt arms;
   a projection focal system housed within said projector body, said projection focal system having an image slide mount frame for the manual introduction of said image slide mounts;
   a battery mount housed within said projector body;
   a microprocessor having a timing circuit, and a power switch both controlling power to an illumination means in said projection focal system, wherein said microprocessor is connected to said battery mount, said timing circuit and said illumination means.

2. The adjustable, toilet projector of claim 1, further comprising:
   a proximity sensor centrally housed within said projector body and rising above a top face of said body; and
   wherein said microprocessor is connected to said proximity sensor and operates said power switch based on a signal received from said proximity sensor and a signal from said timing circuit.

3. The adjustable, toilet projector of claim 2 wherein said projection focal system is housed in a projection tunnel on said projector body and comprises:
   said illumination means;
   said image slide mount frame; and
   a focusing lens.

4. The toilet projector of claim 3, wherein said projection focal system further comprises:
   an optional reflector
   and condensing lens.

5. The toilet projector of claim 1 further comprising:
   an adhesive means affixed to a bottom plate of said tilt base.

6. A method of using a toilet projector, comprising the steps of:
   obtaining a powered toilet projector;
   inserting manually, an image slide mount housing a transparent image slide with an image thereon, into an image slide mount frame of said toilet projector;
   mounting said powered toilet projector onto an underside of a toilet seat lid of a toilet;
   adjusting the position of said toilet projector when said toilet seat lid is in its raised vertical position, such that a light beam from a projection focal system of said toilet projector, illuminates a toilet bowl of said toilet;
   testing the operation of said toilet projector to project said image onto said toilet bowl by providing movement detectable by a proximity sensor of said toilet projector such that said toilet projector illuminates said toilet bowl of said toilet.

7. The method of using a toilet projector of claim 6, comprising the further first steps of:
   digitizing an image by a consumer;
   uploading and transmitting said digitized image from said consumer to a third party;
   receiving said digitized image by said manufacturer;
   preparing a transparent image slide of said digitized image by said manufacturer;
   aligning and mounting said transparent image slide into an image slide mount by said manufacturer;
   providing said image slide mount by said manufacturer to said third party.

8. The method of using a toilet projector of claim 6, comprising the further first steps of:
   providing a printable, blank photo slide substrate with printable blank transparent image slides located on specific printable areas, to said consumer from said third party;
   providing a loadable image slide mount to said consumer from said third party;
   providing a downloadable, image slide software printing application to said consumer from said third party;
   downloading said image slide software printing program onto computer available to said consumer;
   selecting a digitized image and uploading it into the image printing application on said computer by said consumer;
   printing the digitized image by said first party on said printable, blank transparent image slide in the printable areas of the substrate printable photo slide substrate with the photo slide software printing application on an available printer connected to said computer;
   removing a printed image slide from said printable image slide substrate and aligning it on an image slide mount;
   assembling the image slide mount with the aligned image slide.

9. A method of using a toilet projector, comprising the steps of:
   obtaining a powered toilet projector;
   inserting manually, an image slide mount housing a transparent image slide with an image thereon, into an image slide mount frame of said toilet projector;
   mounting said powered toilet projector onto an underside of a toilet seat lid of a toilet.

10. The method of using a toilet projector of claim 9, comprising the further step of:
   adjusting the position of said toilet projector when said toilet seat lid is in its raised vertical position, such that a light beam from a projection focal system of said toilet projector, illuminates a toilet bowl of said toilet.

11. The method of using a toilet projector of claim 9, wherein said powered toilet projector has a microprocessor operated power switch, that upon receiving a signal from a connected proximity sensor that has sensed motion, provides power to an illumination means to project a light beam through a projection focal system.

* * * * *